US012522377B2

(12) United States Patent
Andalam et al.

(10) Patent No.: US 12,522,377 B2
(45) Date of Patent: Jan. 13, 2026

(54) SYSTEM AND METHOD FOR SERVICING AIRCRAFT ENGINES

(71) Applicant: General Electric Company, Evendale, OH (US)

(72) Inventors: Satya Mohan Vamsi Andalam, Bangalore (IN); Vivek Janu, Bangalore (IN); Vamshi Krishna Reddy Kommareddy, Hyderabad (IN); Sandeep Kumar, Bangalore (IN); Andrew Crispin Graham, Badminton (GB)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/978,930

(22) Filed: Dec. 12, 2024

(65) Prior Publication Data

US 2025/0242948 A1    Jul. 31, 2025

Related U.S. Application Data

(63) Continuation of application No. 18/423,657, filed on Jan. 26, 2024, now Pat. No. 12,195,202.

(51) Int. Cl.
*B64F 5/60* (2017.01)
*B64F 5/40* (2017.01)
(Continued)

(52) U.S. Cl.
CPC .............. *B64F 5/60* (2017.01); *F01D 21/003* (2013.01); *G01N 21/9515* (2013.01); *B64F 5/40* (2017.01); *F05D 2260/83* (2013.01)

(58) Field of Classification Search
CPC .. B64F 5/60; B64F 5/40; F01D 21/003; F01D 5/005; F01D 25/285; G01N 21/9515;
(Continued)

(56) References Cited

U.S. PATENT DOCUMENTS 3,095,050 A * 6/1963 Du Berger .............. E21B 25/14
                                                    175/254
3,190,286 A * 6/1965 Stokes ..................... B25J 18/06
                                                    600/179
(Continued)

FOREIGN PATENT DOCUMENTS

CN         217182515          8/2022
CN         217182515 U  *     8/2022
(Continued)

OTHER PUBLICATIONS

U.S. Appl. No. 18/975,319; Non-Final Rejction mailed Jun. 25, 2025; (pp. 1-24).
(Continued)

*Primary Examiner* — Bayan Salone
(74) *Attorney, Agent, or Firm* — Fitch, Even, Tabin & Flannery LLP

(57) ABSTRACT

An apparatus for servicing internal components of an aircraft engine includes a flexible hollow tube; a latching mechanism connected to or incorporated with the flexible hollow tube; and a servicing device to be inserted through the flexible hollow tube. The servicing device is freely moveable through the flexible hollow tube and decoupled from the latching mechanism. The flexible hollow tube is shaped and configured so as to enable proximate positioning of the flexible hollow tube with respect to a rotatable component of an aircraft engine allowing attachment of the flexible hollow tube to the rotatable component via the latching mechanism after the flexible hollow tube is inserted through an entry port of the aircraft engine.

15 Claims, 6 Drawing Sheets

(51) Int. Cl.
 *F01D 21/00* (2006.01)
 *G01N 21/95* (2006.01)

(58) Field of Classification Search
 CPC ............. F05D 2260/83; F05D 2230/72; F05D 2230/80; F05D 2270/8041
 See application file for complete search history.

(56) References Cited

U.S. PATENT DOCUMENTS

| | | | |
|---|---|---|---|
| 3,690,775 | A | 9/1972 | Cousins |
| 3,778,170 | A | 12/1973 | Howell |
| 4,298,312 | A | 11/1981 | Mackenzie |
| 4,522,555 | A | 6/1985 | Inoue |
| 4,991,957 | A | 2/1991 | Sakamoto |
| 5,052,803 | A | 10/1991 | Krauter |
| 5,066,122 | A | 11/1991 | Krauter |
| 5,381,226 | A | 1/1995 | Brunell |
| 5,531,664 | A | 7/1996 | Adachi |
| 7,033,979 | B2 | 4/2006 | Herwig |
| 7,171,279 | B2 * | 1/2007 | Buckingham ........ A61B 1/0055 700/50 |
| 7,721,435 | B2 | 5/2010 | Stokes |
| 8,028,936 | B2 | 10/2011 | Mcdermott |
| 8,219,246 | B2 | 7/2012 | Buckingham |
| 8,277,647 | B2 | 10/2012 | Rice |
| 8,400,501 | B2 | 3/2013 | Heyworth |
| 8,602,722 | B2 | 12/2013 | George |
| 8,758,232 | B2 | 6/2014 | Graham |
| 8,768,509 | B2 | 7/2014 | Unsworth |
| 9,016,159 | B2 * | 4/2015 | Kell ................. G02B 23/2476 74/490.04 |
| 9,138,782 | B2 | 9/2015 | Dorshimer |
| 9,347,855 | B2 * | 5/2016 | Kell ...................... F01D 21/003 |
| 9,403,244 | B2 * | 8/2016 | Rautenberg ............ F01D 5/005 |
| 9,739,168 | B2 | 8/2017 | Ekanayake |
| 9,926,517 | B2 | 3/2018 | Tibbetts |
| 9,932,854 | B1 | 4/2018 | Tibbetts |
| 9,951,647 | B2 | 4/2018 | Rawson |
| 9,957,066 | B2 | 5/2018 | Bewlay |
| 10,005,111 | B2 | 6/2018 | Eriksen |
| 10,018,113 | B2 | 7/2018 | Bewlay |
| 10,227,891 | B2 | 3/2019 | Eriksen |
| 10,323,539 | B2 | 6/2019 | Bewlay |
| 10,335,943 | B2 | 7/2019 | Yoon |
| 10,377,968 | B2 | 8/2019 | Brooks |
| 10,385,723 | B2 | 8/2019 | Flynn |
| 10,634,004 | B2 | 4/2020 | Giljohann |
| 10,669,885 | B2 | 6/2020 | Pecchiol |
| 10,920,181 | B2 | 2/2021 | Martin |
| 11,027,317 | B2 | 6/2021 | Tibbetts |
| 11,103,964 | B2 | 8/2021 | Lipkin |
| 11,260,477 | B2 * | 3/2022 | Huttner ................ B23Q 9/0007 |
| 11,441,446 | B2 | 9/2022 | Rawson |
| 11,458,641 | B2 | 10/2022 | Graham |
| 11,654,547 | B2 | 5/2023 | Graham |
| 11,662,319 | B2 | 5/2023 | Peters |
| 11,707,819 | B2 | 7/2023 | Graham |
| 11,752,622 | B2 | 9/2023 | Graham |
| 12,186,848 | B1 * | 1/2025 | Graham ................. B25J 13/08 |
| 12,195,202 | B1 | 1/2025 | Andalam |
| 2015/0159122 | A1 | 6/2015 | Tibbetts |
| 2017/0165721 | A1 | 6/2017 | Tibbetts |
| 2017/0167290 | A1 | 6/2017 | Kulkarni |
| 2017/0191376 | A1 | 7/2017 | Eriksen |
| 2017/0204739 | A1 | 7/2017 | Rawson |
| 2017/0254217 | A1 | 9/2017 | Eriksen |
| 2018/0149038 | A1 | 5/2018 | Eriksen |
| 2018/0155060 | A1 | 6/2018 | Dauenhauer |
| 2018/0216036 | A1 | 8/2018 | Tibbetts |
| 2018/0237163 | A1 | 8/2018 | Bewlay |
| 2018/0245477 | A1 | 8/2018 | Kulkarni |
| 2018/0258787 | A1 | 9/2018 | Tibbetts |
| 2018/0291803 | A1 | 10/2018 | Belay |
| 2018/0298781 | A1 | 10/2018 | Tibbetts |
| 2018/0313225 | A1 | 11/2018 | Millhaem |
| 2018/0355751 | A1 | 12/2018 | Tibbetts |
| 2019/0063223 | A1 | 2/2019 | Lipkin |
| 2019/0153890 | A1 | 5/2019 | Eriksen |
| 2019/0323378 | A1 | 10/2019 | Tibbetts |
| 2020/0180084 | A1 | 6/2020 | Lipkin |
| 2020/0346310 | A1 * | 11/2020 | Huttner ................ B23Q 9/0007 |
| 2021/0102870 | A1 | 4/2021 | Trivedi |
| 2021/0108537 | A1 | 4/2021 | Rigg |
| 2021/0317752 | A1 | 10/2021 | Deja |
| 2022/0268170 | A1 * | 8/2022 | Andalam .............. F01D 25/285 |
| 2022/0281102 | A1 | 9/2022 | Chungbin |
| 2023/0091418 | A1 * | 3/2023 | Patel ....................... F01D 5/225 29/889.1 |
| 2023/0194234 | A1 | 6/2023 | Graham |
| 2023/0264816 | A1 | 8/2023 | Chung |
| 2025/0242450 | A1 | 7/2025 | Graham |

FOREIGN PATENT DOCUMENTS

| | | | |
|---|---|---|---|
| CN | 218018164 | | 12/2022 |
| CN | 218018164 U | * | 12/2022 |
| CN | 117404145 | | 1/2024 |
| CN | 117404145 A | * | 1/2024 ............... F02K 1/80 |
| DE | 202004014842 | | 2/2006 |
| DE | 112010004203 | | 12/2013 |
| DE | 102013202616 A1 | | 8/2014 |
| DE | 102015006330 | | 11/2016 |
| EP | 2733313 | | 5/2014 |
| EP | 2733313 A2 | * | 5/2014 ........... F01D 21/003 |
| EP | 3075998 A1 | * | 10/2016 ............. F02K 1/766 |
| EP | 3165893 | | 5/2017 |
| EP | 3165893 A1 | * | 5/2017 ........... G01M 15/14 |
| EP | 3510251 | | 8/2021 |
| FR | 3095050 | | 10/2020 |
| FR | 3095050 A1 | * | 10/2020 ........... H04N 23/555 |
| JP | 2010158396 A | | 7/2010 |
| JP | 5276998 | | 8/2013 |
| WO | 2016076704 | | 5/2016 |
| WO | WO-2016076704 A1 | * | 5/2016 ................ B64F 5/60 |
| WO | 2020022474 A1 | | 1/2020 |
| WO | 2020030516 A1 | | 2/2020 |

OTHER PUBLICATIONS

Disclosing You Tube Video entitled "OC Robotics—Snake Arm 101"; https://www.youtube.com/watch?v=lj8VX9YUT_Y; published Sep. 22, 2016; Disclosing screen captures (5 pgs.).

Levine, David J., et al., "Materials with electroprogrammable Stiffness", https://doi.org/10.1002/adma.202007952; Advanced Materials (www.advmat.de); Adv. Mater. 2021, 33, 2007952; Copyright 2021; 26 pgs.

OC Robotics successfully delivers new JetSnake system to Dragages/Bouygues joint venture in Hong Kong; https://www.ocrobotics.com/news-en/oc-robotics-successfully-delivers-new-jetsnake-system-to-dragagesbouygues-joint-venture-in-hong-kong/; which includes youtube link (Sep. 22, 2014) to—https://www.youtube.com/watch?v=AMd925MNO3g; 7 pgs.

U.S. Appl. No. 18/423,657, filed Jan. 26, 2024, entitled "System and Method for Servicing Aircraft Engines".

U.S. Appl. No. 18/423,657; Non-Final Office Action mailed Jun. 11, 2024; (pp. 15).

U.S. Appl. No. 18/423,657; Notice of Allowance mailed Sep. 11, 2024; (pp. 8).

U.S. Appl. No. 18/423,660, filed Jan. 26, 2024, entitled "Method and Apparatus for Servicing Engines".

U.S. Appl. No. 18/423,660; Non-Final Office Action mailed Jun. 12, 2024; (pp. 18).

U.S. Appl. No. 18/423,660; Notice of Allowance mailed Sep. 9, 2024; (pp. 8).

Website for Grainger—Cedarberg Opti Arm: Opti Arm, Opti-View Pac, Fits Cedarberg Brand; https://www.grainger.com/product/60UN62?gucid=N:N:PS:Paid:GGL:CSM-2295:4P7A1P:20501231&gad_source=1&gclid=Cj0KCQiA35urBhDCARIsAOU7QwkvfL

(56) References Cited

OTHER PUBLICATIONS

1Y9hbB4kH8zQ8PknSdv1IA-MiNJGGnX916AZtietBcNI6-nRUaAlvDEALw_wcB&gclsrc=aw.ds.

Website for MSC—Flexbar 12 Inch Long, Magnetic Indicator Base Flexible Arm on C-Clamp; https://www.mscdirect.com/product/details/06432512?cid=ppc-google-&mkwid=%7Cdc&pcrid=&rd=k&product_id=06432512&gad_source=1&gclid=Cj0KCQiA35urBhDCARIsAOU7Qwl_ik6JX5MHhdsu5LxPMyDPKA9_HvGhwiFZXxu-fUOKT35bamtpnCAaAiKIEALw_wcB&gclsrc=aw.ds.

Website for MSC—Indicator Positioner & Holder; https://www.mscdirect.com/product/details/45445103?cid=ppc-google-&mkwid=%7Cdc&pcrid=&rd=k&product_id=45445103&gad_source=4&gclid=Cj0KCQiA35urBhDCARIsAOU7Qwk44KGvETyEld7c3paSDMoEJSx35Qspjz3MgChbayx0moLoLQyyyhcaAksjEALw_wcB&gclsrc=aw.ds.

U.S. Appl. No. 18/975,319, filed Dec. 10, 2024, entitled "Method and Apparatus for Servicing Engines".

U.S. Appl. No. 18/975,319; Requirement for Restriction/Election mailed Apr. 28, 2025; (pp. 8).

\* cited by examiner

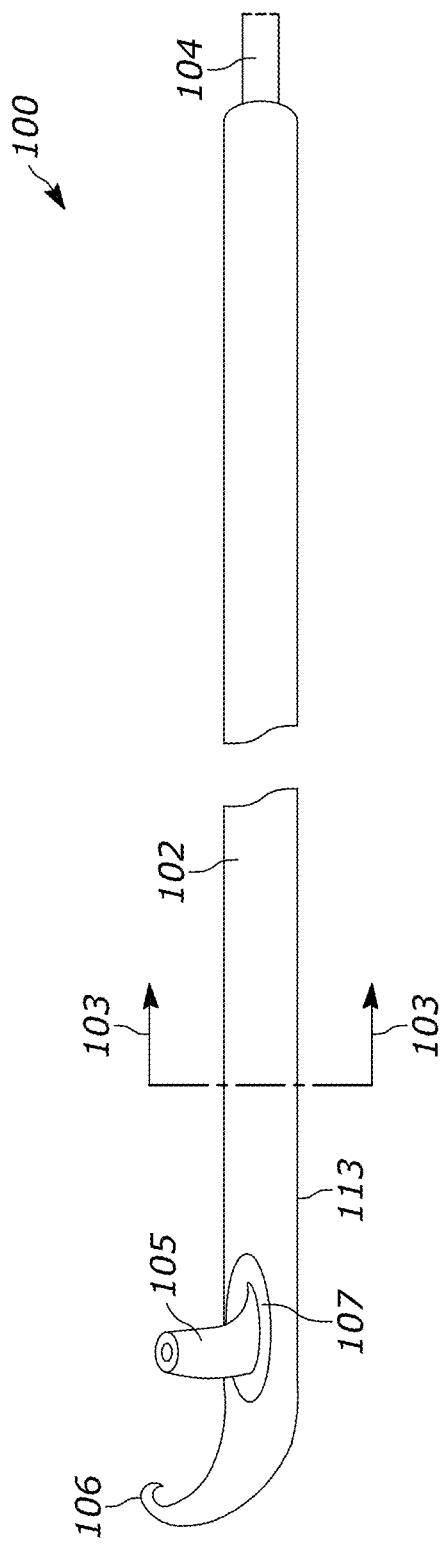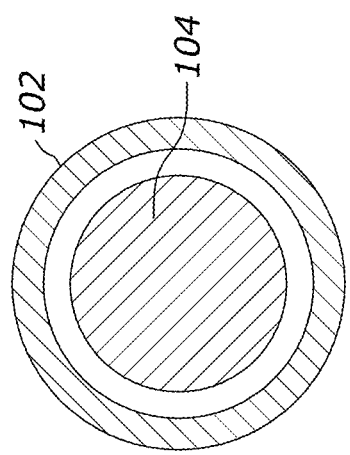
FIG. 1
FIG. 2

SYSTEM AND METHOD FOR SERVICING AIRCRAFT ENGINES

CROSS-REFERENCE TO RELATED APPLICATION(S)

This application is a continuation of U.S. application Ser. No. 18/423,657 filed Jan. 26, 2024, which is incorporated herein by reference in its entirety.

TECHNICAL FIELD

The technical field relates to the servicing of aircraft engines.

BACKGROUND

Engines in general and aircraft engines need to be serviced in different ways. For example, inspections may need to be made of internal aircraft engine components to check for damage. If damage is detected, then servicing operations can sometimes be performed to repair the damage. For example, drills or other tools may be used. Other types of maintenance operations may also be performed.

BRIEF DESCRIPTION OF DRAWINGS

Various needs are at least partially met through provision of approaches that service aircraft engines particularly when studied in conjunction with the drawings. A full and enabling disclosure of the aspects of the present description, including the best mode thereof, directed to one of ordinary skill in the art, is set forth in the specification, which refers to the appended figures, in which:

FIG. 1 comprises a diagram of a system for servicing aircraft engines in accordance with various embodiments of these teachings;

FIG. 2 comprises a cross sectional view of a flexible hollow tube including a servicing device in accordance with various embodiments of these teachings;

Figure 3:
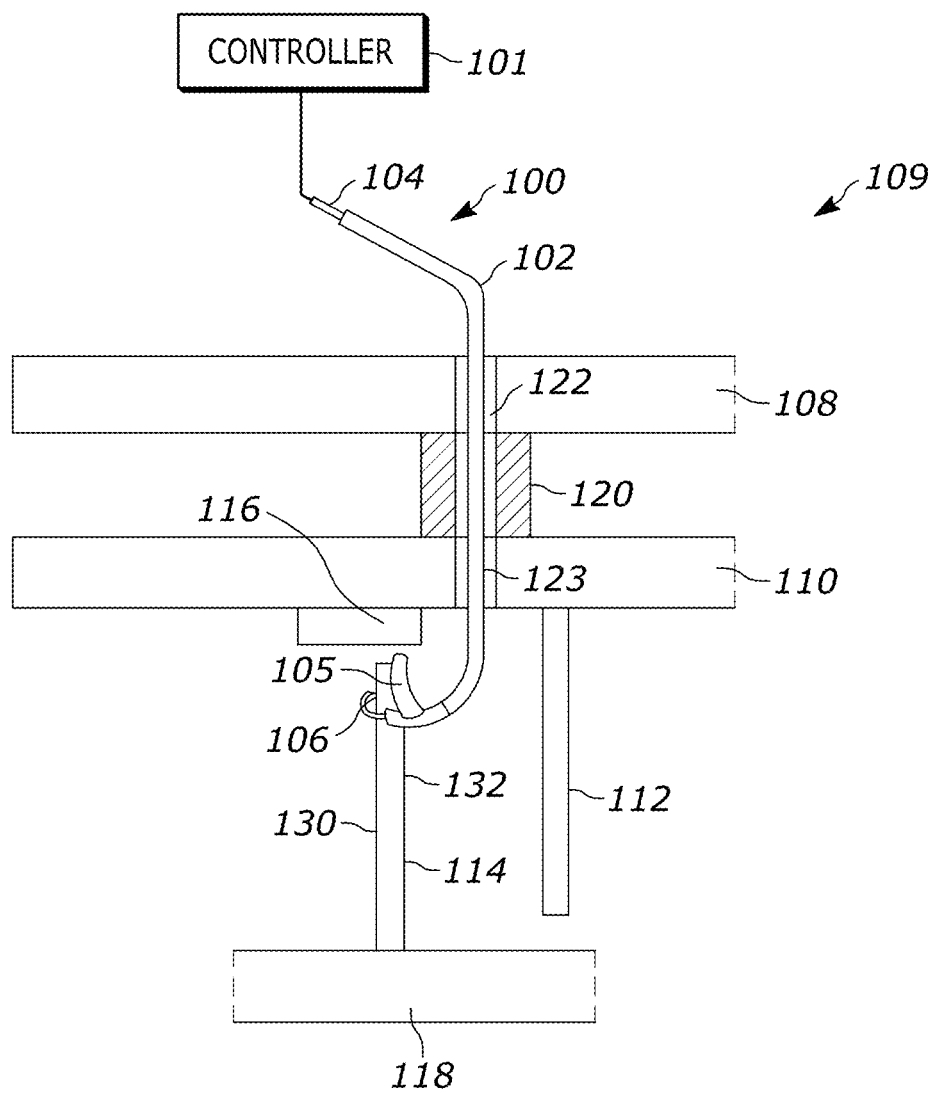
FIG. 3 comprises a diagram of a system for servicing aircraft engines deployed within the engine in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein for servicing aircraft engines include servicing (e.g., inspecting and/or repairing) internal components of these engines. For example, these approaches allow for inspection of shrouds above the high pressure turbine (HPT) blades using borescope inspection (BSI) ports of these engines. Advantageously, cost savings are achieved because of the ability to quickly and easily determine faults of engine components without the use of complicated insertion tools or procedures. These approaches can be customized for different engine types and other compressor and turbine stages as well.

In the approaches provided herein, a flexible hollow tube with a latching mechanism (e.g., a hook) at the distal end of the tube is provided. A servicing device (e.g., a borescope) is inserted through an opening in the proximal end of the tube and passes through the tube and exits the tube through, or uses a line of sight provided by, an opening near the distal end of the tube. The flexible hollow tube acts as a sleeve to protect the servicing device. The flexible hollow tube includes the latching mechanism to secure the flexible hollow tube onto a rotor blade or other engine component. Further, the flexible hollow tube serves as a tether to connect to the rotor blade while the rotor is rotated (e.g., through 360 degrees). The servicing device can be inserted into the flexible hollow tube or removed from the flexible hollow tube even when the flexible hollow tube is engaged to a rotor blade through the opening near the proximal end of the guide tube. When the servicing device includes a camera, these approaches allow for removing the camera from the tube, changing the optical tips of the borescope or changing the orientation of the view of the servicing device, and returning to the same working location through the tube which remains attached at its distal end. Advantageously, the approaches and devices described herein decouple the movement of servicing device and the latching mechanism. The servicing device can move inside the hollow flexible tube even when the distal end of the flexible hollow tube is latched on to a blade (or other structure).

In many of these embodiments, an apparatus for inspecting internal components of an aircraft engine includes a flexible hollow tube; a latching mechanism connected to or incorporated with the flexible hollow tube; and a servicing device extending through the flexible hollow tube. The servicing device is freely moveable through the flexible hollow tube and decoupled from the latching mechanism. The flexible hollow tube is shaped and configured so as to enable proximate positioning of the flexible hollow tube with respect to a rotatable component of an aircraft engine allowing attachment of the flexible hollow tube to the rotatable component via the latching mechanism after the flexible hollow tube is inserted through an entry port of the aircraft engine.

In aspects, the latching mechanism comprises a hook or a wedge mechanism. Other examples of latching mechanisms are possible.

In further aspects, the apparatus further comprises an adapter. The adapter is used in engines with multiple casings to guide the flexible hollow tube into the engine and to the blades. In one example, the adapter is positioned at least partially within the engine between an inner casing and outer casing and is configured to provide a guide path for the flexible hollow tube after the flexible hollow tube is inserted through an entry port of the engine.

In examples, the rotatable component comprises a plurality of blades and the latching mechanism couples to a trailing edge of the one or more of the plurality of blades. In other examples, the rotatable component comprises a plurality of blades and the latching mechanism couples to a leading edge of the one or more of the plurality of blades. Other attachment locations are possible for the flexible hollow tube.

In still other aspects, during operations the servicing device is removed from the flexible hollow tube and another servicing device is inserted into the flexible hollow tube while the flexible hollow tube remains in the aircraft engine. The servicing devices may also be different. For example, one servicing device may be a borescope with a camera and the other servicing device may be configured to perform repairs.

The flexible hollow tube can be constructed of a variety of different materials. For example, the flexible hollow tube may be constructed of Silicone rubber or Thermoplastic elastomers (TPE), including Thermoplastic polyurethane (TPU) or Ethylene vinyl acetate (EVA). Other examples are possible.

As mentioned, the servicing devices may be a number of different devices where these different devices are of different types, are of different configurations, and/or perform different operations. For example, the servicing device may be a borescope. In aspects, the borescope includes a camera and an image is taken of a shroud of the engine. In other examples, the servicing device is configured to perform engine repairs or maintenance operations (e.g., by drilling).

In others of these embodiments, an approach for servicing internal components of an aircraft engine includes inserting a flexible hollow tube into an inspection port of an aircraft engine. The flexible hollow tube has a latching mechanism connected to or incorporated with the flexible hollow tube. The flexible hollow tube is positioned proximate to a rotatable component of the aircraft engine. The flexible hollow tube is attached to the rotatable component via the latching mechanism. A servicing device is inserted through the flexible hollow tube. The servicing device is freely moveable through the flexible hollow tube and decoupled from the latching mechanism.

In further aspects, an adapter may be inserted at least partially within the engine so as to provide a guide path for the flexible hollow tube after being inserted at the entry port. In still further aspects, the servicing device is removed from the flexible hollow tube and another servicing device is inserted into the flexible hollow tube while the flexible hollow tube remains in the aircraft engine.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now collectively to FIG. 1, FIG. 2, FIG. 3, and FIG. 4, one example of an apparatus 100 for servicing internal components of an aircraft engine is described. As shown in these figures, the apparatus 100 includes a flexible hollow tube 102, a servicing device 104 (having a distal end portion 105) extending through an opening 107 of the flexible hollow tube 102, and a latching mechanism 106.

FIG. 2 shows a cross sectional view of the flexible hollow tube 102 taken along a line 103 (as shown in FIG. 1). In this view, the servicing device 104 is disposed within the flexible hollow tube 102.

Figure 4:
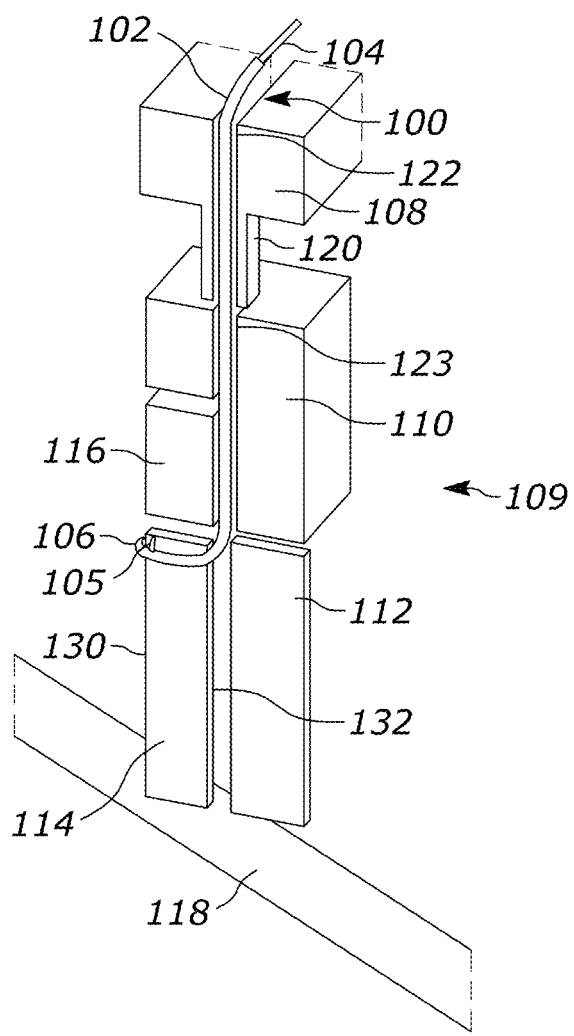
FIG. 4 comprises a diagram of a system for servicing aircraft engines deployed within the engine in accordance with various embodiments of these teachings.

As shown especially with respect to FIG. 3 and FIG. 4, the apparatus 100 is inserted into an engine 109 (for simplicity, only a portion of the engine 109 relating to the turbine section of the engine 109 is shown in FIG. 3 and FIG. 4). In this example, the engine 109 includes an outer casing 108 (with a port or opening 122) and an inner casing 110 (with a port or opening 123). An adapter 120 is positioned between the outer casing 108 and the inner casing 110 allowing the flexible hollow tube 102 to be guided between the port 122 and the port 123. If there is a single casing, the adapter 120 is not needed. The adapter 120 may be constructed of a rigid material and inserted through the port 122 at the same time the servicing device 104 is inserted. In other aspects, the adapter 120 may be pre-positioned between the outer casing 108 and the inner casing 110 during manufacturing and/or assembly of the engine or at some other convenient time.

The engine 109 further includes a vane 112 and a blade 114. For simplicity, only a single blade and vane are shown, but it will be appreciated that the engine 109 includes multiple vanes and blades. The engine 109 also includes a shroud 116 deployed above (or radially outward of) the blade 114 and extending completely around all the rotor blades. The blade 114 is connected to a shaft 118, which rotates thereby moving the blade 114 (and the other blades coupled to the shaft 118). The blade 114 also includes a leading edge 130 and a trailing edge 132.

The engine 109 may be any type of aircraft engine including, but not limited to a ducted turbofan aircraft engine and an unducted turbofan aircraft engine to mention two examples. Other examples of engine types are possible.

In aspects, the flexible hollow tube 102 is constructed of a flexible material such as Silicone rubber or Thermoplastic elastomers (TPE) (e.g., Thermoplastic polyurethane (TPU) or Ethylene vinyl acetate (EVA)). The material used to construct the flexible hollow tube 102 may have coefficients of friction in the range of 0.05-0.5. As the flexible hollow tube 102 deploys, capstan friction may affect its behaviour if the coefficient of friction is high and if it rubs on a stationary component so that material with a low coefficient of friction is preferred. In still other aspects, a range of modulus of elasticity (e.g., 0.0005-5 GPa) for the material is used to construct the flexible hollow tube 102. Other examples of ranges are possible.

The flexible hollow tube 102 may be circular in cross section but other cross sections are possible such as cross sections having differently shaped cross sections are possible. For example, another example cross section includes a flat surface allowing the flexible hollow tube 102 to sit on internal engine components in a defined orientation when positioned in the engine 109.

In yet other aspects, the flexible hollow tube 102 has the ability to return to its original shape after being temporarily deformed by being inserted into the engine 109 (e.g., by being squeezed through the ports 122, 123, and/or the adapter 120). In these regards, the flexible hollow tube 102 may be initially formed and/or configured to have a specific shape so that when the flexible hollow tube 102 is inserted into the engine 109 the shape allows distal portion 113 of the flexible hollow tube 102 to be positioned in vicinity of the blade 114 (by virtue of the pre-formed shape) allowing easy attachment of the blade 114 and deployment of the servicing device 104. The servicing device 104 can then be deployed at a correct or convenient position within the engine 109 allowing the servicing device 104 to perform its task. For example, if the servicing device 104 includes a camera, then the pre-formed shape of the flexible hollow tube 102 allows for easy attachment of the flexible hollow tube 102 to the blade 114 and the ability of the camera to obtain images of the shroud 116. The behaviour of the flexible hollow tube 102 can be considered to be a super elastic nature in that after the after the flexible hollow tube 102 has been stressed into a different shape (by inserting it through ports 122 and 123), after this stress is removed (because the flexible hollow tube 102 has emerged from the ports 122 and 123), the flexible hollow tube 102 then returns to its original, pre-formed shape.

The servicing device 104 is any type of device that allows any type of work or operation to be performed within the engine 109. For example, the servicing device 104 may be a borescope and/or include a camera. The camera may obtain single or multiple images (e.g., a movie or video). In other aspects, the servicing device 104 may perform repair operations with engine components. For example, the servicing device 104 may include a drill, sealant dispenser, laser energy device or other devices that can repair damage to engine components.

While the flexible hollow tube 102 is deployed within the engine 109, various types of servicing devices 104 may be deployed within the flexible hollow tube 102, removed from the flexible hollow tube 102, and then different servicing devices 104 inserted into the flexible hollow tube 102. For example, a first servicing device 104 (e.g., a borescope with a camera to obtain images) may be inserted and operated within the flexible hollow tube 102; the first servicing device 104 may be removed from the flexible hollow tube 102, and then a second servicing device 104 (e.g., a maintenance device with a drill) may be inserted within the flexible hollow tube 102. The second servicing device 104 may be used to perform repairs that have been identified by the first servicing device 104.

The flexible hollow tube 102 may be manually inserted into engine 109 through the ports 122 and 123. The adapter 120 may also be inserted manually either before the insertion of the flexible hollow tube 102 or with the insertion of the flexible hollow tube 102. Alternatively, the flexible hollow tube 102 and/or adapter 120 may be inserted using a robot or other machine. Removal of the flexible hollow tube 102 may be accomplished either manually or by a robot or machine as well.

In other aspects and in some operations, once the flexible hollow tube 102 has been inserted into a rotor section of the engine 109 and attached to the blade 114, the rotor may be rotated. Rotation of the rotor may be accomplished by turning the shaft 118 of the engine 109. As the shaft 118 is rotated, all the blades of the rotor attached to the shaft 118 (including the blade 114) are rotated. For example, in one operation the flexible hollow tube 102 is attached to the blade 114. A person (or machine) rotates the shaft 118 of the engine 109 thereby rotating the blade 114 attached to the shaft 118. As the rotation is performed, a camera of the servicing device 104 obtains images (e.g., a movie or video) of the shroud 116 (e.g., the entire shroud or multiple portions of the shroud 116).

A controller 101 (e.g., a microprocessor or the like) may be coupled to the servicing device 104. The controller 101 may control the movement/insertion of the servicing device 104 (e.g., by moving the service device), control operations of the servicing device 104 (e.g., control a drill of the servicing device 104 when the servicing device 104 includes a drill), and/or analyze data from the servicing device 104 (e.g., receive images from the servicing device 104 when the servicing device 104 includes a camera and render these images on a display to a user).

Figure 6:
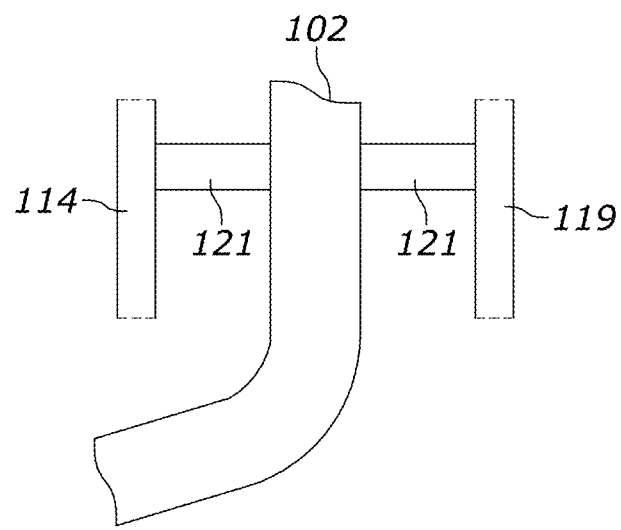
FIG. 6 comprises a diagram of a latching mechanism in accordance with various embodiments of these teachings.

The latching mechanism 106 may be any type of device or mechanism used to attach, wedge, and/or secure the flexible hollow tube 102 to the blade 114 (or between one or more of the blades). In aspects and as shown in the example of FIG. 1, FIG. 2, FIG. 3, and FIG. 4 the latching mechanism 106 is a hook. The dimensions of the hook allow it to attach to a blade of the engine. However, another example of a latching mechanism is shown in FIG. 6 that is not a hook and secures the flexible hollow tube 102 via a wedge mechanism between the vane 112 and the blade 114. The latching mechanism 106 may be formed with the flexible hollow tube 102 (e.g., as a monolithic structure), or may be a separate part or component that is attached or incorporated (e.g., via a threaded fastener, an adhesive, etc.) with the flexible hollow tube 102. Another example of a latching mechanism may be an inflatable bag or balloon, either attached to or formed as part of the body of the tube 102 at or near the distal end of the tube 102.

In one example of the use of the apparatus 100, inspection of the shroud 116 in a high pressure turbine (HPT) is performed by accessing the ports 122 and 123. The adapter 120 with an internal passage connects the ports 122 and 123 and guides the flexible hollow tube 102.

The flexible hollow tube 102 is inserted through the port 122, the adapter 120, and the port 123. The flexible hollow tube 102 has been pre-formed into a specific shape, deforms as it passes through the port 122, adapter 120, and port 123 and then reforms into the preset shape after exiting the port 123. The pre-formed shape has been selected such that when the flexible hollow tube 102 returns to its original shape, the flexible hollow tube 102 will be positioned in the engine 109 so as to allow easy attachment to the blade 114 and/or easy inspection of the shroud 116 by the servicing device 104. The pre-formed shape may be curved in one example, but may take on a large number of shapes, configurations, and dimensions.

The latching mechanism 106 with a hook feature at the distal portion 113 attaches the flexible hollow tube 102 to the blade 114. This can be performed manually or automatically.

The shaft 118 of the engine 109 is turned to move the rotor and position the rotor blades (including the blade 114) in a pre-defined position with respect to the vanes (including the vane 112). The adapter 120 is fitted into the port 122 and the flexible hollow tube 102 is inserted into the internal passage of the adapter 120 along a pre-defined orientation that directs the flexible hollow tube 102 towards the rotor blades including the blade 114.

The flexible hollow tube 102 is pushed into the adapter 120 until a pre-defined length is reached allowing the flexible hollow tube 102 to glide in between the rotor blades (including the blade 114) and position the latching mechanism (e.g., a hook feature) near the trailing edge 132 of the rotor blade 114.

The shaft 118 of the engine 109 is manually or automatically rotated in a pre-defined direction to engage the latching mechanism (e.g., hook) and pull the flexible hollow tube 102 along with the rotor blades. In aspects, when the latching mechanism 106 is a hook, the hook may be located at or near the tip of the flexible hollow tube 102 and the opening 107 located behind the hook. The servicing device 104 (e.g., a borescope) is inserted through the flexible hollow tube 102 until the distal end portion 105 of the servicing device 104 exits through the opening 107 near at the distal portion 113 of the flexible hollow tube 102.

The rotor of the engine 109 is then rotated again. The servicing device 104 takes multiple images/videos of shroud 116 during this rotational movement through, for example, 360 degrees of rotor rotation. After inspection and/or the servicing operations are performed, the servicing device 104 (e.g., borescope) is removed from the flexible hollow tube 102. The shaft 118 of the engine 109 is rotated in a direction opposite to the original direction of rotation to retrieve the flexible hollow tube 102 from the engine 109. In aspects, during initial rotation more of the flexible hollow tube 102 is pulled into the engine and the opposite occurs during removal. In other aspects, friction hold the latching mechanism 106 in place on a blade preventing the blade from sliding along the blade.

Figure 5:
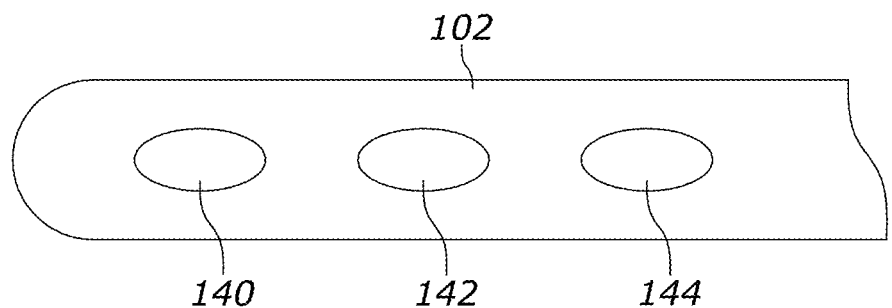
FIG. 5 comprises a diagram of a distal end of the servicing device with multiple openings in accordance with various embodiments of these teachings.

Referring now to FIG. 5, one example of a flexible hollow tube 102 having multiple openings is described. In the examples of FIG. 1, FIG. 2, FIG. 3, and FIG. 4, the flexible hollow tube 102 has a single opening 107 at the distal end portion 113 of the flexible hollow tube 102. In the example of FIG. 5, the flexible hollow tube 102 has openings 140, 142, and 144. The user can select which opening 140, 142, or 144 the servicing device 104 should emerge. In addition, one servicing device 104 may use one of the openings 140, 142, and 144, while a second and/or different servicing device 104 may use a different one of the openings 140, 142, and 144.

The openings 140, 142, and 144 may be at the distal end portion 113 of the flexible hollow tube, but it will be appreciated that the openings can be placed at any location along the length of the flexible hollow tube 102. Also, although three openings 140, 142, and 144 are shown, it will be understood that any number of openings may be used. The openings 140, 142, and 144 may be located on the different sides of the flexible hollow tube 102 allowing the servicing device 104 (or multiple servicing devices) to exit the flexible hollow tube 102 in different directions.

The use of multiple openings makes it convenient to deploy the flexible hollow tube 102 inside the engine 109 and then leave the flexible hollow tube 102 in place, providing a series of apertures aligned to engine features such as a nozzle leading edge feature, e.g., having a similar angular periodicity, and then move the inspection or repair device to each aperture of the tube in turn to perform some maintenance, inspection etc. The flexible hollow tube 102 may be circular in cross section but other cross sections (e.g., square, rectangular, hexagonal, etc.) are possible such as cross sections having a flat external surface to sit on internal engine components (e.g., to sit on a gas path internal diameter) and thereby control orientation of the flexible hollow tube 102.

Referring now to FIG. 6, an example of a latching mechanism 106 that is not a hook is described. In the example of FIG. 1, FIG. 2, FIG. 3, and FIG. 4, the latching mechanism 106 used a hook. In the example of FIG. 6, however, the latching mechanism 106 uses wedges 121 to wedge or secure the flexible hollow tube 102 between the blade 114 and another blade 119. The wedges 121 may be constructed of any suitable material that is flexible enough to fit through the ports 122 and 123 but strong enough to allow securement of the flexible hollow tube 102.

Other options for the latching mechanism are possible including suction or magnetic-based structures attached or incorporated with the flexible hollow tube 102 that allow attachment to the blade 114. In still other aspects, the flexible hollow tube 102 may be attached to other structures within the engine 109.

Figure 7:
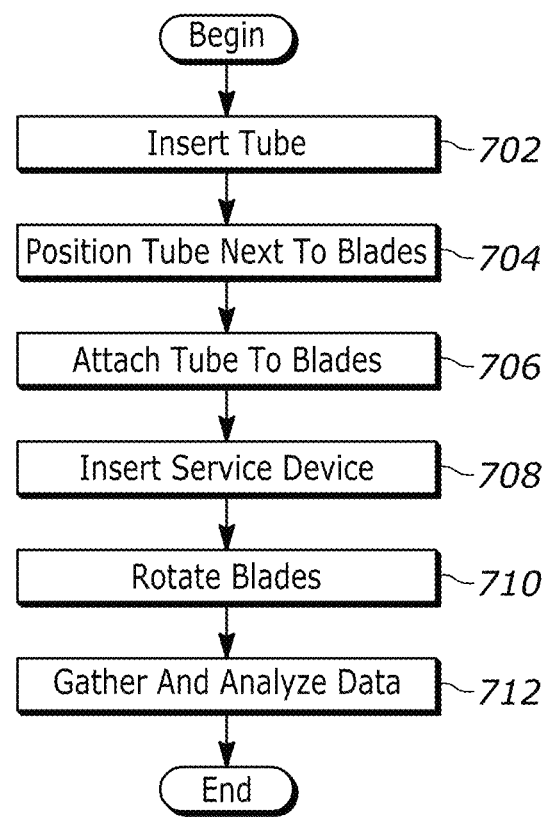
FIG. 7 comprises a flowchart of an approach for servicing an aircraft engine in accordance with various embodiments of these teachings.

Referring now to FIG. 7, one example of an approach for servicing an aircraft engine is described. At step 702, the flexible hollow tube 102 is inserted into a port in the engine 109. The flexible hollow tube 102 has the latching mechanism 106, which is connected to or incorporated with the flexible hollow tube 102.

At step 704, the flexible hollow tube 102 is positioned to be proximate to a rotatable component of the aircraft engine 109 such as the blade 114. At step 706, the flexible hollow tube 102 is attached to the rotatable component (e.g., the blade 114) via the latching mechanism 106. In examples, the latching mechanism 106 is a hook. Other examples are possible.

At step 708, the servicing device 104 is inserted through the flexible hollow tube 102. The servicing device 104 is freely moveable through the flexible hollow tube 102 and decoupled from the latching mechanism 106.

At step 710, the blade is rotated. At step 712, data may be gathered from the servicing device 104 and this data may be analyzed.

In other examples, the adapter 120 is inserted at least partially within the engine so as to provide a guide path for the flexible hollow tube 102. In other aspects, the rotatable component is a plurality of blades (including the blade 114) and the latching mechanism 106 couples to the trailing edge 132 of the one or more of the plurality of blades. In still other examples, the rotatable component is a plurality of blades and the latching mechanism 106 couples to the leading edge 130 of the one or more of the plurality of blades.

In other aspects, after removing the servicing device 104 from the flexible hollow tube 102 another servicing device 104 is inserted into the flexible hollow tube 102 while the flexible hollow tube 102 remains in the aircraft engine 109. This can be repeated with a number of different servicing devices 104.

Figure 8:
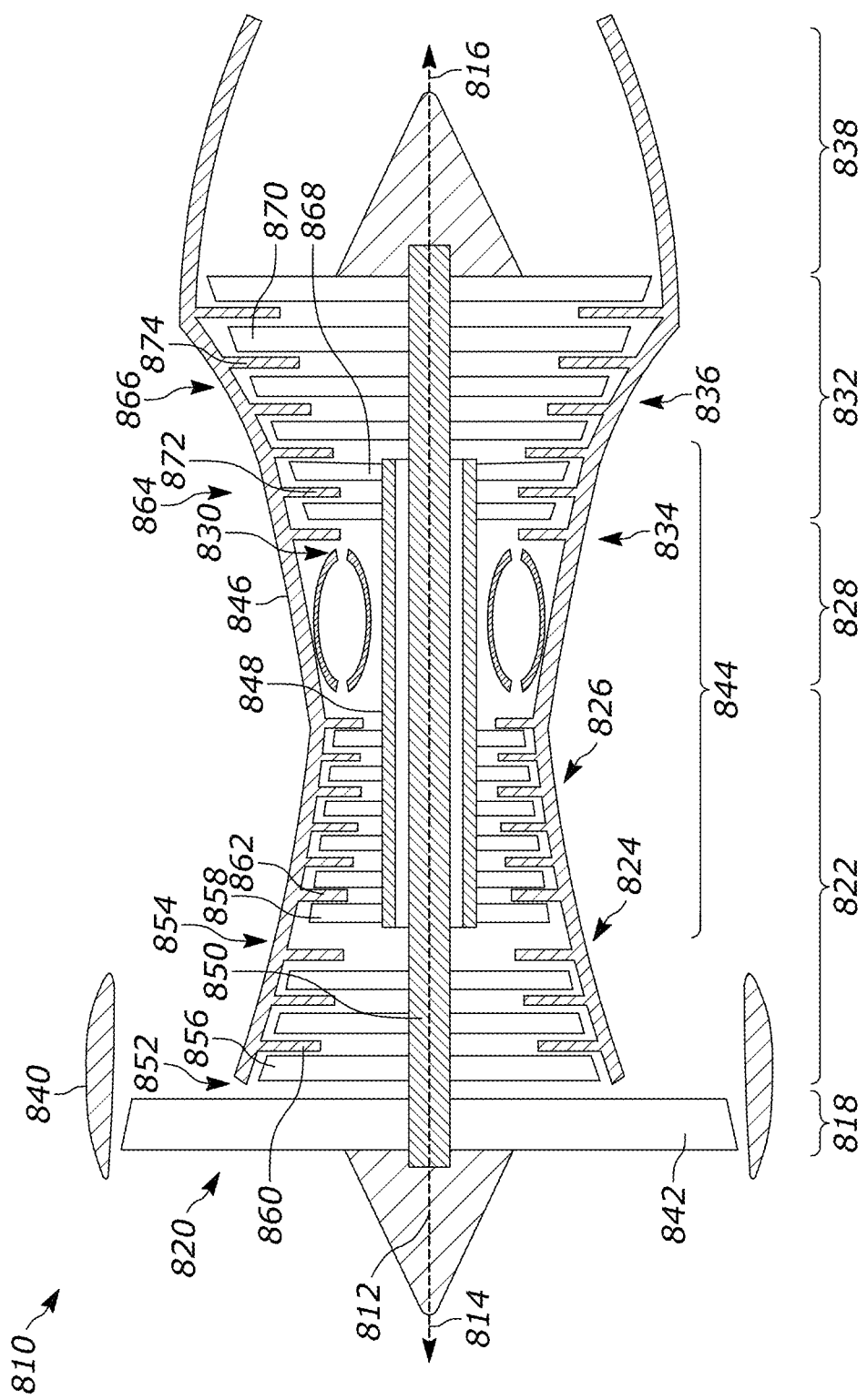
FIG. 8 comprises a diagram of an aircraft engine in accordance with various embodiments of these teachings.

Referring now to FIG. 8, a schematic cross-sectional diagram of a conventional gas turbine engine 810 for an aircraft in which an imaging and inspection system described herein can operate is described. The gas turbine engine 810 has a generally longitudinally extending axis or centerline 812 extending forward 814 to aft 816. The gas turbine engine 810 includes, in downstream serial flow relationship, a fan section 818 including a fan 820, a compressor section 822 including a booster or low pressure (LP) compressor 824 and a high pressure (HP) compressor 826, a combustion section 828 including a combustor 830, a turbine section 832 including a HP turbine 834 and a LP turbine 836, and an exhaust section 838.

The fan section 818 includes a fan casing 840 surrounding the fan 820. The fan 820 includes a plurality of fan blades 842 disposed radially about the centerline 812.

The HP compressor 826, the combustor 830, and the HP turbine 834 form a core 844 of the gas turbine engine 810 which generates combustion gases. The core 844 is surrounded by core casing 846 which can be coupled with the fan casing 840.

An HP shaft or spool 848 disposed coaxially about the centerline 812 of the gas turbine engine 810 drivingly connects the HP turbine 834 to the HP compressor 826. An LP shaft or spool 850, which is disposed coaxially about the centerline 812 of the gas turbine engine 810 within the larger diameter annular HP spool 848, drivingly connects the LP turbine 836 to the LP compressor 824 and fan 820.

The LP compressor 824 and the HP compressor 826 respectively include a plurality of compressor stages 852, 854, in which a set of compressor blades 856, 858 rotate relative to a corresponding set of static compressor vanes 860, 862 (also called a nozzle) to compress or pressurize the stream of fluid passing through the stage. In a single compressor stage 852, 854, multiple compressor blades 856, 858 can be provided in a ring and extend radially outwardly relative to the centerline 812, from a blade platform to a blade tip, while the corresponding static compressor vanes 860, 862 are positioned downstream of and adjacent to the rotating blades 856, 858. It is noted that the number of blades, vanes, and compressor stages shown in FIG. 8 were selected for illustrative purposes only, and that other numbers are possible.

The HP turbine 834 and the LP turbine 836 respectively include a plurality of turbine stages 864, 866, in which a set of turbine blades 868, 870 are rotated relative to a corresponding set of static turbine vanes 872, 874 (also called a nozzle) to extract energy from the stream of fluid passing through the stage. In a single turbine stage 864, 866, multiple turbine blades 868, 870 can be provided in a ring and extend radially outwardly relative to the centerline 812, from a blade platform to a blade tip, while the corresponding static turbine vanes 872, 874 are positioned upstream of and adjacent to the rotating blades 868, 870. It is noted that the number of blades, vanes, and turbine stages shown in FIG. 8 were selected for illustrative purposes only, and that other numbers are possible.

In operation, the rotating fan 820 supplies ambient air to the LP compressor 824, which then supplies pressurized ambient air to the HP compressor 826, which further pressurizes the ambient air. The pressurized air from the HP compressor 826 is mixed with fuel in the combustor 830 and ignited, thereby generating combustion gases. Some work is extracted from these gases by the HP turbine 834, which drives the HP compressor 826. The combustion gases are discharged into the LP turbine 836, which extracts additional work to drive the LP compressor 824, and the exhaust gas is ultimately discharged from the gas turbine engine 810 via the exhaust section 838. The driving of the LP turbine 836 drives the LP spool 850 to rotate the fan 820 and the LP compressor 824.

It will be appreciated that although not depicted in FIG. 8, the gas turbine engine 810 may further define a plurality of openings allowing for inspection of various components within the gas turbine engine 810. For example, the gas turbine engine 810 may define a plurality of insertion tool openings at various axial positions within the compressor section, the combustion section 828, and/or the turbine section 832. Additionally, as will be discussed below, the gas turbine engine 810 may include one or more igniter ports within, e.g., the combustion section 828 of the gas turbine engine 810, that may allow for inspection of the combustion section 828.

Through these openings, the flexible hollow tube 102 can be inserted along with the servicing device 104 as has been described elsewhere herein. For example, one of these openings may be in the vicinity of and allow access to the turbine section 832. The latching mechanism 106 may be secured to one of the turbine blades 868, 870 and the various operations performed with the servicing device 104. It will also be appreciated that these approaches may be performed at any location in the gas turbine engine 810 where the openings are available such as in the combustion section 828.

It should further be appreciated that the exemplary gas turbine engine 810 depicted in FIG. 8 is by way of example only, and that in other exemplary embodiments, the gas turbine engine 810 may have any other suitable configuration, including, for example, any other suitable number of shafts or spools, turbines, compressors, etc. Additionally, or alternatively, in other exemplary embodiments, any other suitable turbine engine may be inspected with the tool described herein. For example, in other exemplary embodiments, the engine may not be a turbofan engine, and instead may be configured as a turboshaft engine, a turboprop engine, turbojet engine, etc., or may be an industrial gas turbine engine for electricity generation, fluid pumping etc.

Further aspects of the invention are provided by the subject matter of the following clauses:

An apparatus for servicing internal components of an aircraft engine, the apparatus comprising: a flexible hollow tube; a latching mechanism connected to or incorporated with the flexible hollow tube; a servicing device to be inserted through the flexible hollow tube, the servicing device being freely moveable through the flexible hollow tube and decoupled from the latching mechanism; and wherein the flexible hollow tube is shaped and configured so as to enable proximate positioning of the flexible hollow tube with respect to a rotatable component of an aircraft engine allowing attachment of the flexible hollow tube to the rotatable component via the latching mechanism after the flexible hollow tube is inserted through an entry port of the aircraft engine.

The apparatus of any of the preceding clauses, wherein the latching mechanism comprises a hook The apparatus of any of the preceding clauses, wherein the hook is integrally formed with the flexible hollow tube.

The apparatus of any of the preceding clauses, wherein the latching mechanism comprises a wedge mechanism.

The apparatus of any of the preceding clauses, further comprising an adapter, the adapter to be positioned at least partially within the engine and being configured to provide a guide path for the flexible hollow tube after being inserted at the entry port.

The apparatus of any of the preceding clauses, wherein the servicing device is removed from the flexible hollow tube and another servicing device is inserted into the flexible hollow tube while the flexible hollow tube remains in the aircraft engine.

The apparatus of any of the preceding clauses, wherein the flexible hollow tube comprises openings at a distal end of the flexible hollow tube.

The apparatus of any of the preceding clauses, wherein the flexible hollow tube is constructed of Silicone rubber or Thermoplastic elastomers (TPEs).

The apparatus of any of the preceding clauses, wherein the servicing device is a borescope.

The apparatus of any of the preceding clauses, wherein the borescope includes a camera.

A method for servicing internal components of an aircraft engine, the method comprising: inserting a flexible hollow tube into a port in an aircraft engine, the flexible hollow tube having a latching mechanism connected to or incorporated with the flexible hollow tube; positioning the flexible hollow tube proximate to a rotatable component of the aircraft engine; attaching the flexible hollow tube to the rotatable component via the latching mechanism; and inserting a servicing device through the flexible hollow tube, the servicing device being freely moveable through the flexible hollow tube and decoupled from the latching mechanism.

The method of any of the preceding clauses, further comprising rotating the rotatable component to cause the latching mechanism to attach to the component.

The method of any of the preceding clauses, wherein the latching mechanism comprises a hook or a wedge mechanism.

The method of any of the preceding clauses, further comprising positioning an adapter at least partially within the engine so as to provide a guide path for the flexible hollow tube after being inserted at the entry port.

The method of any of the preceding clauses, wherein the rotatable component is a plurality of blades and the latching mechanism couples to a trailing edge of the one or more of the plurality of blades.

The method of any of the preceding clauses, wherein the rotatable component is a plurality of blades and the latching mechanism couples to a leading edge of the one or more of the plurality of blades.

The method of any of the preceding clauses, further comprising removing the servicing device from the flexible hollow tube and inserting another servicing device into the flexible hollow tube while the flexible hollow tube remains in the aircraft engine.

The method of any of the preceding clauses, wherein the flexible hollow tube is constructed of Silicone rubber or Thermoplastic elastomers (TPEs).

The method of any of the preceding clauses, wherein the servicing device is a borescope.

The method of any of the preceding clauses, wherein the borescope includes a camera and an image is taken of a shroud of the engine.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The invention claimed is:

1. An apparatus for servicing internal components of a turbine engine, the apparatus comprising:
   a flexible hollow tube having a length wherein the flexible hollow tube comprises a plurality of openings disposed along the length of the flexible hollow tube;
   a latching mechanism connected to or incorporated with the flexible hollow tube;
   a servicing device to be inserted through the flexible hollow tube, the servicing device being freely moveable through the flexible hollow tube and decoupled from the latching mechanism;
   wherein the flexible hollow tube is shaped and configured so as to enable proximate positioning of the flexible hollow tube with respect to a rotatable component of a turbine engine allowing attachment of the flexible hollow tube to the rotatable component via the latching mechanism after the flexible hollow tube is inserted through an entry port of the turbine engine;
   wherein the latching mechanism is configured to be attached to the rotatable component when the rotatable component is rotated; and
   wherein after positioning, the servicing apparatus is to operate through different ones of the plurality of openings at different times.

2. The apparatus of claim 1, wherein the plurality of openings are disposed on different sides of the flexible hollow tube.

3. The apparatus of claim 2, wherein the plurality of openings are arranged so that the servicing device exits the flexible hollow tube in different directions.

4. The apparatus of claim 1, wherein the latching mechanism comprises a hook.

5. The apparatus of claim 4, wherein the hook is integrally formed with the flexible hollow tube.

6. The apparatus of claim 1, wherein the latching mechanism comprises a wedge mechanism.

7. The apparatus of claim 1, further comprising an adapter, the adapter to be positioned at least partially within the turbine engine and being configured to provide a guide path for the flexible hollow tube after being inserted at the entry port.

8. The apparatus of claim 1, wherein the servicing device is a first servicing device, the apparatus further comprising a second servicing device configured to be inserted into the flexible hollow tube after the first servicing device has been removed from the flexible hollow tube and while the flexible hollow tube remains in the turbine.

9. The apparatus of claim 1, wherein the flexible hollow tube is constructed of Silicone rubber or Thermoplastic elastomers (TPEs).

10. The apparatus of claim 1, wherein the servicing device is a borescope.

11. The apparatus of claim 10, wherein the borescope includes a camera.

12. The apparatus of claim 1, wherein the apparatus is used to perform an inspection operation.

13. The apparatus of claim 12, wherein the inspection operation involves an inspection of a shroud in an aircraft engine.

14. The apparatus of claim 1, wherein the flexible hollow tube is circular in the cross section.

15. The apparatus of claim 1, wherein the servicing device includes one or more of a drill, sealant dispenser, or laser energy device.

* * * * *